US010016768B2

(12) United States Patent
Van Wolferen et al.

(10) Patent No.: US 10,016,768 B2
(45) Date of Patent: Jul. 10, 2018

(54) VORTEX FINDER FOR A CYCLONIC SEPARATOR

(71) Applicant: KONINKLIJKE PHILIPS N.V., Eindhoven (NL)

(72) Inventors: Paulus Hermanus Van Wolferen, Eindhoven (NL); Johannes Tseard Van Der Kooi, Eindhoven (NL); Paulus Cornelis Duineveld, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/917,109

(22) PCT Filed: Apr. 1, 2015

(86) PCT No.: PCT/EP2015/057137
§ 371 (c)(1),
(2) Date: Mar. 7, 2016

(87) PCT Pub. No.: WO2015/150435
PCT Pub. Date: Oct. 8, 2015

(65) Prior Publication Data
US 2017/0008014 A1    Jan. 12, 2017

(30) Foreign Application Priority Data

Apr. 4, 2014    (EP) .................................... 14163549

(51) Int. Cl.
*B01D 45/08*    (2006.01)
*B04C 5/13*    (2006.01)
(Continued)

(52) U.S. Cl.
CPC .............. *B04C 5/13* (2013.01); *A47L 9/1666* (2013.01); *B01D 50/002* (2013.01);
(Continued)

(58) Field of Classification Search
CPC ... B04C 5/13; B04C 2005/136; A47L 9/1666; A47L 9/1608; A47L 9/1683; A47L 9/1641; B01D 45/16; B01D 50/002
See application file for complete search history.

(56) References Cited

U.S. PATENT DOCUMENTS 964,428 A * 7/1910 Jonhson .................... B04C 5/13
                                                    55/413
4,260,401 A    4/1981 Truhan
(Continued)

FOREIGN PATENT DOCUMENTS

CN    103126611 A    6/2013
EP      1714703 A2   10/2006
(Continued)

*Primary Examiner* — Dung H Bui

(57) ABSTRACT

A vortex finder (18,27,40) for a cyclonic separator (1) through which air flowing in a helical path 'D' about an axis A-A of a cyclone chamber (4) passes to an outlet (6) is disclosed. The vortex finder comprises a plurality of stationary overlapping vanes (13,19) extending in an axial direction and spaced radially around said axis 'A', the vanes (13,19) being positioned relative to each other so a helical flow of air about the axis of the cyclone chamber (4) passes over an outer surface (16) of the vanes (13,19) with a portion of the air flow being redirected around a leading edge (14) of each vane (13,19) and through a gap between adjacent vanes (13,19) to the outlet (6). At any point along the axis, a portion of an outer surface (16,20,30,46) of each vane (13,19,28,41) lies on a circle having its center coaxial with said axis, the outer surface (16,20,30,46) of each vane (13,19,28,41) having a portion leading towards the leading edge (14,33,47) that extends inwardly away from the circle so that the leading edge (14,33,47) of each vane (13,19,28, 41) about which air is redirected through the gap between vanes (13,19,28,41) is located within a region bound by said (Continued)

circle to create a region of overpressure on the outer surface (16) of the adjacent vane (13,19) in the vicinity of the gap.

20 Claims, 7 Drawing Sheets

(51) Int. Cl.
    *B01D 50/00*     (2006.01)
    *A47L 9/16*     (2006.01)

(52) U.S. Cl.
    CPC ........... *A47L 9/1608* (2013.01); *A47L 9/1641* (2013.01); *A47L 9/1683* (2013.01); *B04C 2005/136* (2013.01)

(56) References Cited

U.S. PATENT DOCUMENTS

| | | | |
|---|---|---|---|
| 6,679,930 B1 | 1/2004 | An | |
| 6,757,933 B2* | 7/2004 | Oh | A47L 9/1691 15/347 |
| 6,810,557 B2* | 11/2004 | Hansen | A47L 9/1666 15/352 |
| 7,744,668 B2* | 6/2010 | Oh | A47L 9/1625 15/352 |
| 8,302,253 B2* | 11/2012 | Ni | A47L 9/1683 15/353 |
| 9,049,972 B1* | 6/2015 | Krebs | A47L 5/28 |
| 2003/0066273 A1* | 4/2003 | Choi | A47L 9/1666 55/337 |
| 2003/0159239 A1* | 8/2003 | Oh | A47L 9/1666 15/353 |
| 2004/0163207 A1* | 8/2004 | Oh | A47L 9/122 15/353 |
| 2006/0042206 A1* | 3/2006 | Arnold | A47L 9/1608 55/424 |
| 2006/0179802 A1* | 8/2006 | French | A47L 9/1658 55/459.1 |
| 2006/0236663 A1 | 10/2006 | Oh | |
| 2007/0122276 A1 | 5/2007 | Oh | |
| 2007/0175189 A1* | 8/2007 | Gomiciaga-Pereda | B04C 5/13 55/459.4 |
| 2009/0007369 A1* | 1/2009 | Gomiciaga-Pereda | A47L 9/1633 15/347 |
| 2009/0133370 A1* | 5/2009 | Yoo | A47L 9/1633 55/429 |
| 2010/0043170 A1* | 2/2010 | Ni | A47L 9/1625 15/352 |
| 2010/0043365 A1* | 2/2010 | Fujiyama | B01D 45/06 55/426 |
| 2010/0132316 A1* | 6/2010 | Ni | A47L 9/1625 55/343 |
| 2012/0324847 A1* | 12/2012 | Dupree | B23K 31/022 55/458 |
| 2014/0215751 A1* | 8/2014 | Kasper | A47L 9/104 15/347 |
| 2014/0373307 A1* | 12/2014 | Van Der Kooi | A47L 9/0081 15/353 |

FOREIGN PATENT DOCUMENTS

| | | |
|---|---|---|
| GB | 2375980 A | 4/2002 |
| JP | 2000130398 A | 5/2000 |
| JP | 2010249038 A | 11/2010 |
| WO | 2000064321 A1 | 11/2000 |
| WO | 2013093377 A1 | 6/2013 |

\* cited by examiner

VORTEX FINDER FOR A CYCLONIC SEPARATOR

This application is the U.S. National Phase application under 35 U.S.C. § 371 of International Application No. PCT/EP2015/057137, filed on Apr. 1, 2015, which claims the benefit of International Application No. 14163549.0 filed on Apr. 4, 2014. These applications are hereby incorporated by reference herein.

FIELD OF THE INVENTION

The present invention relates to a vortex finder for a cyclonic separator and to a cyclonic separator comprising a vortex finder according to the invention. The invention also relates to a vacuum cleaner comprising the vortex finder and/or a cyclonic separator according to the invention.

BACKGROUND OF THE INVENTION

Cyclonic separators rely on rotational effects to separate solids entrained in a fluid flow without using a filter. Cyclone separators are commonly used to separate dust and debris from the suction airflow of vacuum cleaners. Known cyclonic separators comprise a cylindrical or conical cyclone chamber with an air inlet and an air outlet. The air inlet is angled obliquely to the central axis of the cyclone chamber so that when debris laden air enters the cyclone chamber via the inlet, a rapidly rotating flowing air flow or vortex is established within the cyclone chamber. The air enters the cyclone chamber via an inlet and flows towards the opposite end. Centrifugal force generated by the circular air flow throws the dust particles towards the wall of the cyclone chamber from where they fall into a collection chamber. The air flows in an opposite direction through the center of the cyclone and is exhausted through an outlet. A vortex finder is located over the outlet through which the air flows. The function of the vortex finder is to ensure a stable rotational flow to improve separation performance. In particular, a vortex finder prevents turbulence in the vicinity of the outlet causing excessive noise, loss of pressure, and reduction of the collection efficiency of the separator. A vortex finder also prevents certain types of debris that does not readily fall into the collection chamber and that tends to remain in the inner air flow, from exiting the cyclone chamber through the outlet.

WO20064321A1 discloses a cyclonic separator having a vortex finder that seeks to reduce turbulence and loss of pressure in the vicinity of the cyclone outlet.

U.S. Pat. No. 4,260,401 discloses a cyclone-type particulate collector and concentrator wherein the outlet tube is provided with a conical concentrator having its sidewalls formed of a plurality of tapered, spaced, nested, generally U-shaped and cross-section vaned members between which the gas entering the outlet tube must pass in flowing to the outlet end of the outlet tube. A portion of the sidewall of the outlet tube of the cyclone-type particulate collector is provided with a gate to act as a particulate skimmer which opens into the gas inlet volute for recirculation of the skimmed particles.

SUMMARY OF THE INVENTION

The present invention seeks to provide a vortex finder that further reduces the pressure drop to increase air flow while improving separation performance. The invention is defined by the independent claims; the dependent claims define advantageous embodiments.

According to the present invention, there is provided a vortex finder for a cyclonic separator through which air flowing about an axis of a cyclone chamber passes to an outlet, the vortex finder comprising a plurality of stationary vanes spaced radially around said axis when installed in a cyclone chamber, the vanes being positioned relative to each other so a flow of air about the axis of the cyclone chamber passes over an outer surface of the vanes with a portion of the air flow being redirected around a leading edge of each vane and through a gap between adjacent vanes to the outlet, wherein a portion of an outer surface of each vane lies on a circle having its center coaxial with said axis at any point along the axis and the outer surface of each vane has a portion that extends inwardly away from the circle towards the leading edge of the vane so that the leading edge of each vane about which air is redirected through the gap between vanes is located within a region bound by said circle. As the outer surface of each vane extends inwardly, at least some air flowing across a vane follows its outer surface and so is directed inwardly and towards the surface of the next vane where it impacts to create a region of overpressure that reduces the degree of turbulence in the air as it leaves the leading edge of the preceding vane.

Preferably, at least said inwardly extending portion of said outer surface of each vane, i.e. that part of the outer surface which extends to its leading edge, is arcuate in shape. An arcuately shaped outer surface maintains a smooth flow of air over the outer surface of the vane towards its leading edge.

In some embodiments, each vane may have an outer surface that defines a recessed region positioned so that air directed inwardly by the preceding vane is received within said recessed region so that said region of overpressure is generated in said recessed region.

Each vane may have a trailing edge and the outer surface may extends outwardly from the trailing edge towards the circle. At least that portion of the outer surface that extends outwardly from the trailing edge may be arcuate in shape so as to maintain a smooth flow of air across the outer surface of the vanes.

In preferred embodiments, an angle β between a first plane that extends at a tangent to the outer surface at the leading edge of a vane and a second plane that extends at a tangent to the outer surface of an adjacent vane at a point where the first tangent line intersects said adjacent vane is greater than 15 degrees and preferably greater than 30 degrees. In a most preferred embodiment, angle β is between 60 and 120 degrees. By ensuring that this angle at least exceeds 15 degrees, the region of overpressure that is created is sufficient to minimize the turbulent air flowing off the leading edge of the preceding vane.

A portion of the outer surface of each vane that lies on a circle at any point along the axis can have an radius R, whilst a portion of the arcuately shaped outer surface of each vane that extends inwardly towards the axis has a radius r, with r<R. Most preferably, radius r is >0.2 mm and preferably >0.4 mm. In a most preferred embodiment, r is at least 2 mm. The value r may reduce as the vanes taper towards the apex of the vortex finder.

Preferably, each vane narrows or tapers towards its leading edge and may also taper towards its trailing edge.

In some embodiments, the vanes may extend in a helical path about the axis and may also taper inwardly towards the axis so that the vortex finder is essentially cone-shaped.

According to another aspect, there is also provided a cyclonic separator comprising the vortex finder according to the invention.

The invention also provides a vacuum cleaner comprising the cyclonic separator according to the invention.

These and other aspects of the invention will be apparent from and elucidated with reference to the embodiments described hereinafter.

BRIEF DESCRIPTION OF THE DRAWINGS

Embodiments of the invention will now be described, by way of example only, with reference to the accompanying drawings, in which:

FIG. 7b is an enlarged view of part of the cross-section shown in FIG. 7a;

FIG. 9b illustrates an enlarged view of part of the cross-section shown in FIG. 9a;

DETAILED DESCRIPTION OF EMBODIMENTS

Figure 1:
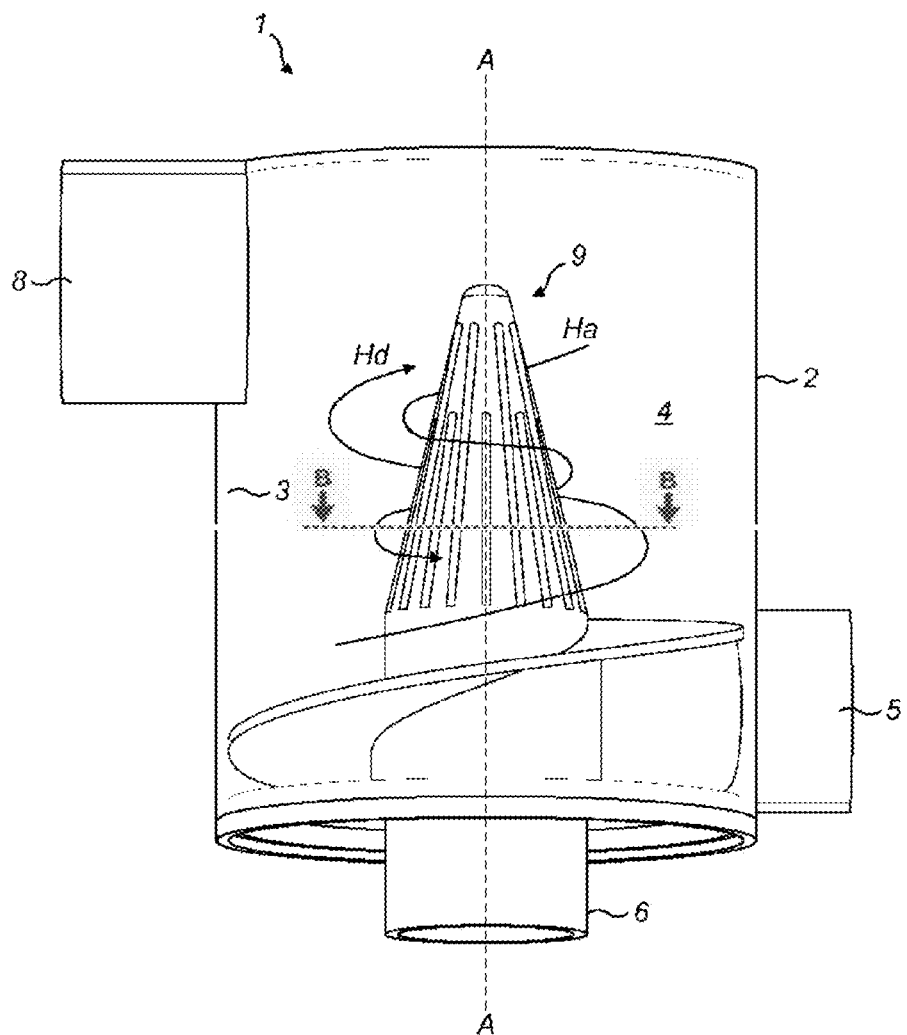
FIG. 1 is a cross-sectional side view of a known cyclonic separator.
Figures 2A, 2B, 2C:
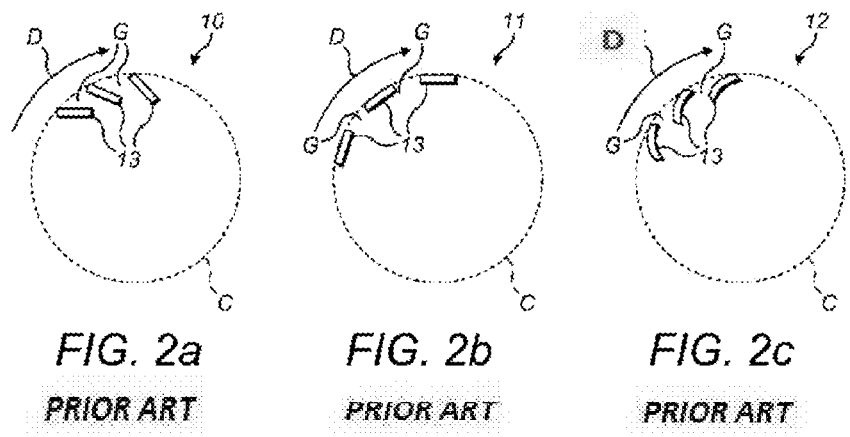
FIGS. 2a to 2c are cross-sectional views showing vane configurations for three different versions of known vortex finders.
Figure 3:
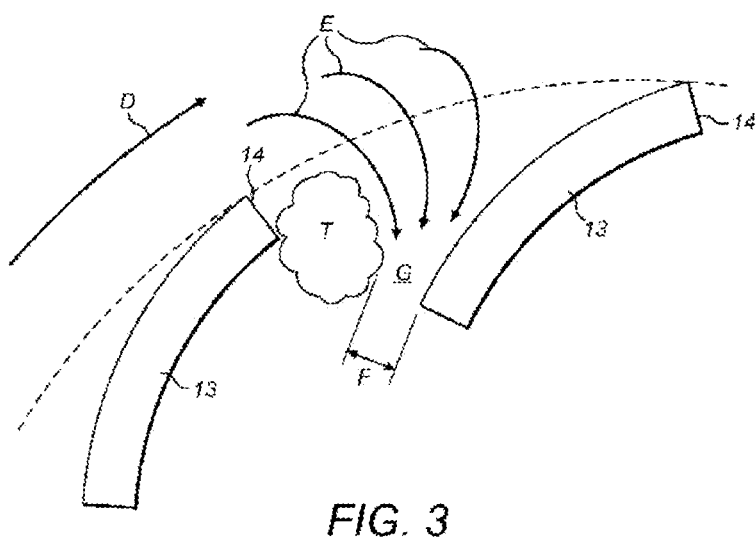
FIG. 3 is a partial enlarged view of the vane configuration shown in FIG. 2c showing how air is redirected around the leading edge of each vane and through the gap between adjacent vanes.

Referring now to FIGS. 1 to 3, a known cyclonic separator 1 that may be used for a bagless-type vacuum cleaner is shown. The cyclonic separator 1 comprises a cyclone housing 2.

The cyclone housing 2 has an inner peripheral wall surface 3 that defines a cyclone chamber 4, a tangentially positioned debris-laden air inlet 5 and an axially positioned clean air outlet 6. The cyclone chamber 4 has a longitudinal axis denoted by line 'A-A'. A tangentially positioned debris laden air outlet 8 is provided at the opposite end of the chamber 4 to the debris inlet 5, which leads to a debris collection chamber (not shown).

The inlet 5 is angled tangentially to the central axis A-A of the cyclone chamber 4 such that air and entrained debris drawn into the cyclone chamber 4 through the inlet 5 will flow in a helical or swirling path $H_d$ towards the outlet 8.

Debris entrained in the airflow is directed outwardly under centrifugal force and passes through the outlet 8 and into the debris collection chamber.

Due to pressure differentials within the cyclone chamber 4, the airflow reverses direction within the cyclone chamber 4 to form a secondary, predominantly clean, airflow that flows along the axis of the cyclone chamber 5 towards the outlet in path $H_a$, within the airflow $H_d$. This airflow flows out of the outlet 6 and is vented to atmosphere.

A vortex finder 9 is received in the cyclone chamber 4 over the outlet 6, and the flow of air $H_a$ passes through the vortex finder 9 to the outlet 6. The configuration of the vortex finder 9 in a cyclonic separator has a significant influence on the function of the cyclone, particularly in connection with minimizing pressure loss whilst also preventing interference between the descending and ascending air streams, as well as in preventing any remaining debris entrained in the air flow from passing through the outlet 6.

Embodiments of the present invention relate to a vortex finder that has a series of vanes that are optimally positioned to reduce turbulence and/or minimize pressure drop in comparison with prior art vortex finder vane configurations. In particular, the vane configuration of embodiments of the present invention have been seen to provide a reduction in the pressure drop across the vanes in comparison with known vortex finder configurations, whilst maintaining or improving separation performance of the cyclone.

By way of background, FIGS. 2a to 2c show cross-sectional views of three different but known vortex finder configurations. For the purposes of clarity, if one of these illustrated vortex finders 10, 11, 12 were to be installed on the cyclonic separator 1 of FIG. 1, FIGS. 2a to 2c would represent a cross-section through the vortex finder 9 taken along the line marked B-B in FIG. 1. The dotted line in each of FIGS. 2a to 2c is an imaginary circle 'C' to indicate the relative positions of the vanes 13 forming the vortex finder 10,11,12 in each case. It will be apparent that each vane 13 at least partially lies on or touches the circumference of the circle 'C'. In each of FIGS. 2a to 2c, only three vanes 13 are shown for convenience, although it will be appreciated that there are a much greater number of vanes 13 in the same orientation extending around the entire circumference of the circle 'C'.

Arrow 'D' in FIGS. 2a to 2c represents the flow of air passing through the cyclone chamber and which flows circumferentially around the vortex finder 10,11,12 in the direction shown.

In the vortex finder vane configuration of FIG. 2a, it will be apparent that the vanes 13 are spaced from each other and angled in a direction towards the incoming air flow 'D' so that air passes through the gaps 'G' between the vanes 13 relatively easily. This arrangement presents a relatively low resistance to air flow. Whilst the pressure drop and turbulence created with this vane arrangement is minimized, the separation performance is undesirably decreased resulting in debris that is still entrained in the ascending airflow passing through the outlet more readily.

In the vortex finder vane configuration of FIG. 2b, the vanes 13 are spaced from each other but extend in a circumferential direction around the circle 'C'. This configuration generates a relatively high resistance to air flow 'D' and a greater degree of turbulence resulting in an increased pressure drop over the vortex finder.

Finally, in the vortex finder vane configuration of FIG. 2c, the vanes are 13 angled in a direction away from the air flow 'D' so that air flows over the outside surface of the vanes 13 and must change direction before passing into the gaps 'G' between adjacent vanes 13. Whilst the separation performance is improved in the arrangement of FIG. 2c, in comparison with the arrangement of FIG. 2a or 2b, this vane configuration also produces a high resistance to airflow, as will now be explained in more detail with reference to FIG. 3.

FIG. 3 illustrates an enlarged view of a portion of the vane arrangement shown in FIG. 2c (but with only two vanes being shown in FIG. 3). It will be appreciated that, as shown by arrows 'E', the air passing over the vanes 13 must turn a sharp corner, i.e. through substantially 180 degrees for it to enter the gap 'G' between adjacent vanes 13. At a leading edge or tip 14 of each vane 13, air is released from the vane 13 and creates a 'wake' or region with high eddy currents in the air flow. The wake creates a high degree of turbulence (as indicated by region 'T' in FIG. 3) that grows to a maximum size dissipating energy and resulting in a significant pressure drop in this area. In effect, the gap 'G' between adjacent vanes 13 is effectively partially blocked by this turbulent region leaving less space (as indicated by dimension 'F' in FIG. 3) for the air to flow smoothly through the gap 'G' without hindrance. The flow of air through the gap 'G' is effectively restricted or choked by the turbulent airflow region 'T'.

According to embodiments of the present invention illustrated by FIGS. 4 to 12, the vanes 13 are shaped in order to reduce the size of the turbulent region 'T'. As a result, a smaller proportion of the gap 'G' is restricted or choked by the turbulent region T, so that air can flow through a much wider part of the gap 'G' unrestricted or choked, as indicated by dimension 'H' in FIG. 4, which is larger than dimension 'F' in FIG. 3. As airflow is no longer restricted by the turbulent air to the same extent as with the vane configuration of FIG. 3, the pressure drop is controlled and minimized to a greater extent.

Figure 4:
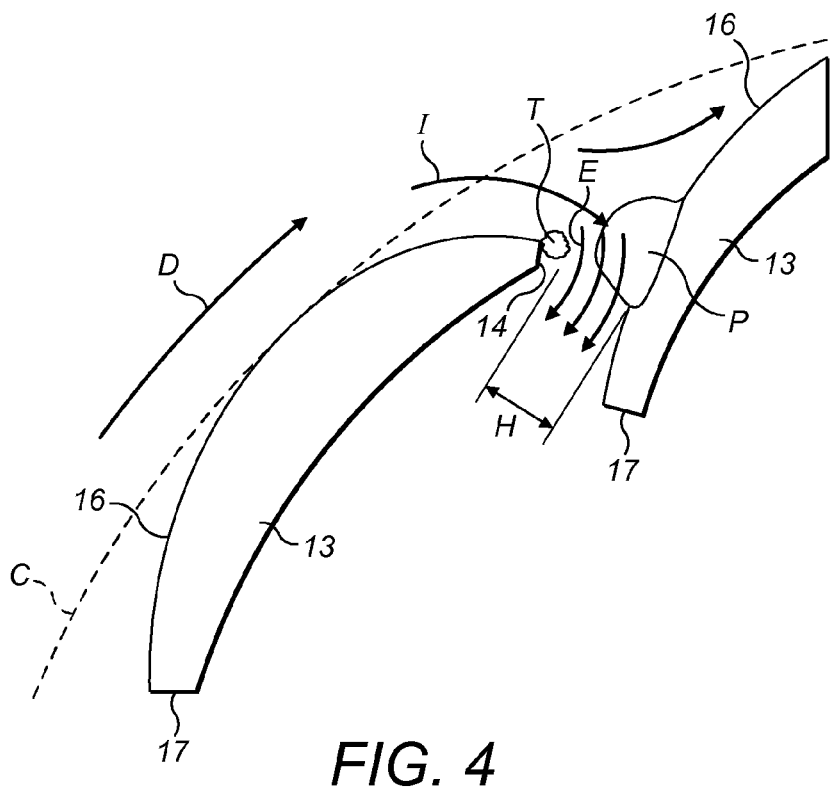
FIG. 4 is a partial enlarged view of a vortex finder vane configuration showing the direction of airflow according to an embodiment of the present invention.

As shown in FIG. 4, the vanes 13 have a similar orientation to that shown in FIG. 2c, except that they are shaped in a particular way. The shape and arrangement of the vanes 13 causes some of the air flowing across the outer surface 16 of each vane 13 to be directed towards the outer surface 16 of the immediately adjacent vane 13 in the direction of air flow 'D', so that it collides or impacts upon the outer surface 16 of the adjacent vane 13. The impaction of air against the outer surface 16 of an adjacent vane 13 generates an area of increased pressure relative to surrounding areas, as indicated by the region denoted 'P' in FIG. 4. This area of overpressure 'P' reduces the degree of turbulence 'T' that is otherwise formed by the airflow as it leaves the leading edge 14 of the preceding vane 13 and may even eliminate the turbulence altogether. The area of overpressure 'P' does not hinder the incoming air flow to any significant extent and any hindrance that it does create is more than compensated by the reduced area of turbulence 'T'. Upon impingement of the air against the vane, a transfer of energy occurs. Energy stored in the air in the form of its velocity reduces and becomes energy in the form of pressure. This transfer of energy between velocity and pressure occurs with little or no loss in overall energy.

Whilst a portion of the outer surface 16 of each vane 13 lies on a circle 'C' centered on the axis A, the outer surface 16 extends or curves inwardly away from the circle 'C' towards the axis A so that the leading edge 14 of each vane 13 is spaced inwardly from the circle 'C' and lies within a region bound by it. This causes some air flowing over the vanes 13 to be directed inwardly (in the direction of arrow 'I' in FIG. 4) as it follows the outer surface 16 of the vane 13 as it approaches its leading edge 14, the remaining air flow continuing to flow around the outer circumference of the vortex finder and taking part in the flow around subsequent vanes 13. The inwardly directed air around a leading edge 14 of a vane 13 impacts the outer surface 16 of the subsequent vane 13 to form the area of increased pressure 'P' that reduces the size of the turbulent area 'T'.

Figure 5:
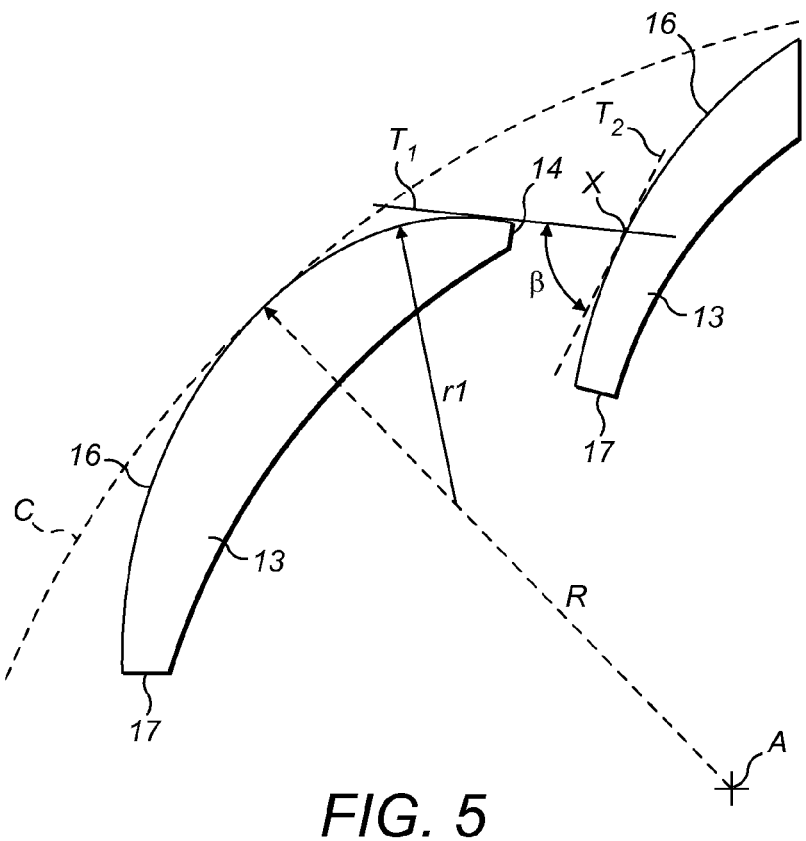
FIG. 5 is the same view as FIG. 4 without the airflow shown but showing various geometric dimensions.

As shown in FIG. 4, the outer surface 16 of each vane 13 is arcuate in shape. In particular, the inwardly extending part towards the leading edge 14 has a curved profile to smoothly direct the air flow towards the outer surface 16 of the adjacent vane 13. With reference to FIG. 5, the radius of the circle 'C' about which a portion of an outer surface 16 of the vanes 13 lie is denoted by 'R', whereas the radius of the inwardly extending part extending towards the leading edge 14 is denoted by r1. It will be appreciated that r1<R. r1 should also be greater than 0.2 mm and preferably >0.4 mm. In a most preferred embodiment, r is at least 2 mm. The value r may reduce as the vanes 13 taper towards the apex Y of the vortex finder 18.

As shown in FIGS. 4 and 5, the entire outer surface 16 of each vane 13 is arcuate in shape so that a portion of the outer surface 16 that extends from a trailing edge 17 towards the portion that lies on the circle 'C' with radius R is also curved. FIG. 5 shows a line denoting a plane $T_1$ that extends at a tangent to the outer surface 16 of a vane 13 at its leading edge 14 and, a second plane $T_2$ that extends at a tangent to the outer surface 16 of an adjacent vane 13 in the direction of air flow and taken at a point 'X' where the first tangent line $T_1$ intersects the outer surface 16 of said adjacent vane 13. The angle β between the tangent planes $T_1$ and $T_2$ is >15 degrees and preferably greater than 30 degrees. In a most preferred embodiment, angle β is between 60-120 degrees. Different angles may be obtained by largely retaining the exiting vane profile but by, for example, providing each vane with a protuberance or by changing its shape close to or at the leading edge 14 of each vane 13 so as to alter the airflow pattern.

With reference to FIGS. 4 and 5, it will also be apparent that each vane 13 is tapered. In particular, each vane 13 tapers towards its leading edge 14 which also reduces the turbulent region 'T' and increases the size of the gap 'G' between adjacent vanes 13.

Figure 6:
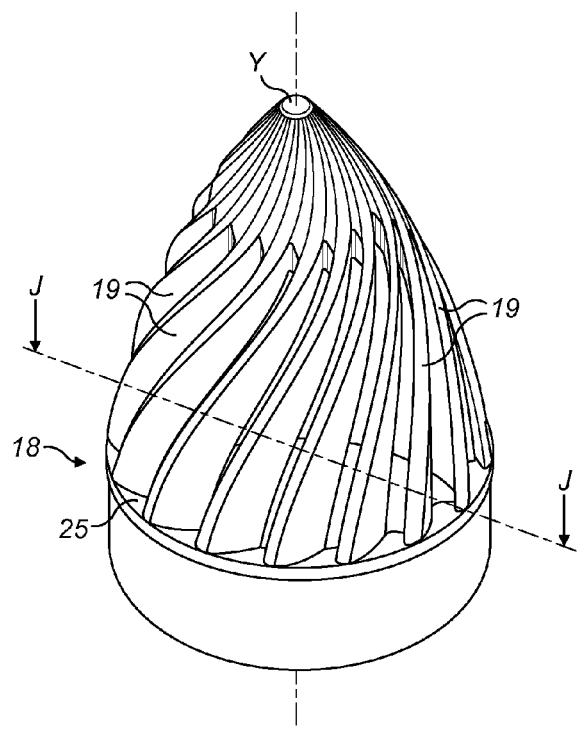
FIG. 6 is a perspective view of a vortex finder according to an embodiment of the invention.

FIG. 6 shows a vortex finder 18 having vanes 19 with the profile described with reference to FIGS. 4 and 5, but in which the vanes 19 extend in a helical path about the axis A-A of the cyclone chamber 4. The vanes 19 extend from a collar 25 and taper inwardly to an apex 'Y' so that the vortex finder 18 is essentially cone-shaped. When mounted over the outlet 6 within the cyclone chamber 4, the apex 'Y' of the vortex finder 19 is coaxial with the longitudinal axis A-A of the chamber 4 and points towards the opposite end 7 of the cyclone chamber 4.

Figure 7A:
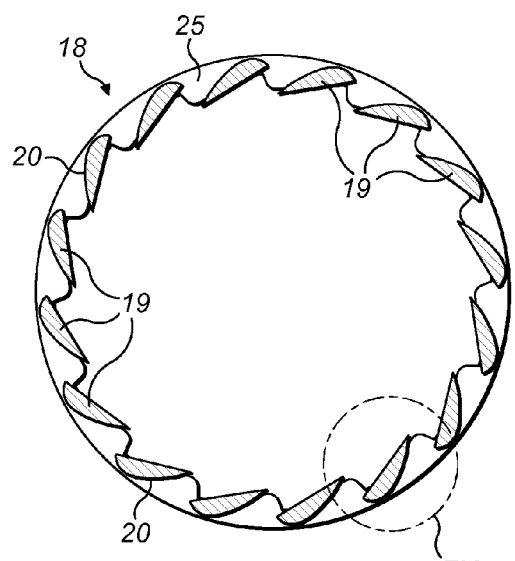
FIG. 7a is a cross section taken along the line J-J in FIG. 6.
Figure 7B:
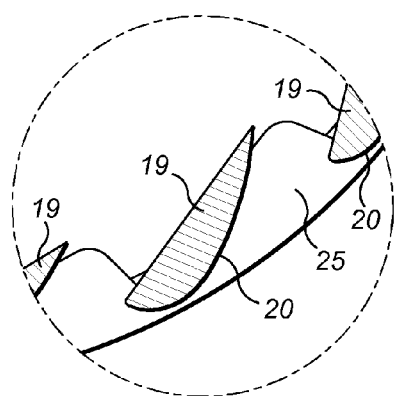

FIG. 7a shows a cross-section through the vortex finder 18 of FIG. 6 taken along the line J-J, and FIG. 7b illustrates an enlarged version of one vane 19 and part of the vanes 19 on either side of it. It will be appreciated from FIGS. 7a and 7b that the profile of the outer surface 20 of each vane 19 is shaped as described with reference to FIGS. 4 and 5.

Figure 8:
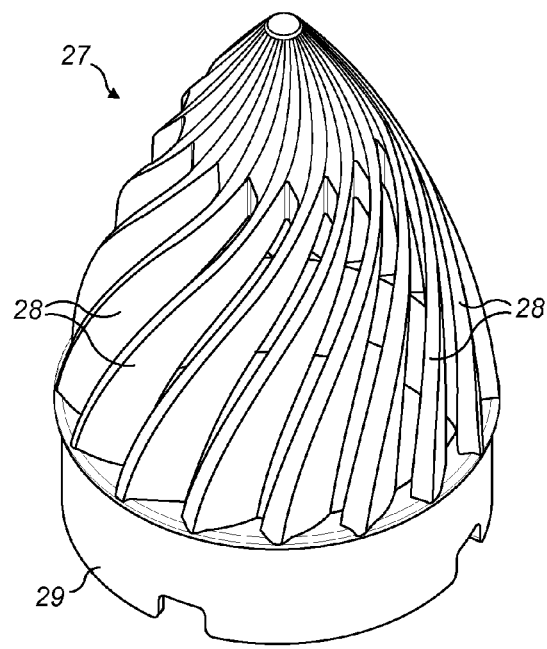
FIG. 8 is a perspective view of a vortex finder according to another embodiment.
Figure 9A:
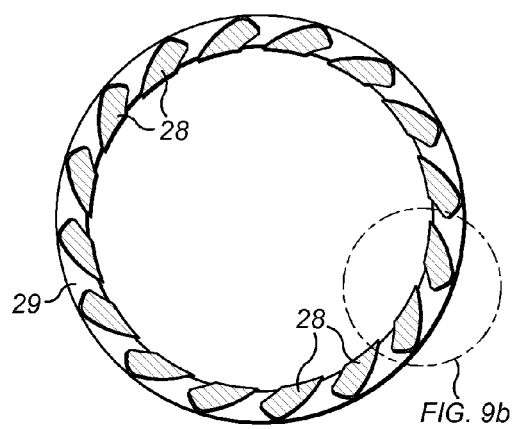
FIG. 9a shows a cross-section through the vortex finder of FIG. 8.
Figure 9B:
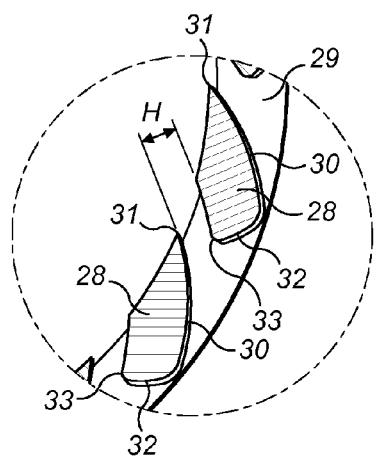

FIG. 8 shows a vortex finder 27 having a similar form to the vortex finder 18 of FIG. 6, except that the vanes 28 extending from a collar 29 have a slightly different profile. The outer surface 30 of each vane that extends from a trailing edge 31 of each vane to the portion that lies on circle 'C' is arcuate in shape, as is the surface of the inwardly extending part 32 leading towards the leading edge 33 from the portion that lies on circle 'C', and so each vane 28 is similar to vane 19 of FIGS. 6 and 7. However, the radius r1 of the inwardly extending part 32 is considerably smaller than radius r1 of the embodiment of FIGS. 6 and 7 and the vanes 28 do not taper towards their leading edge 33. FIG. 9*a* shows a cross-section through the vortex finder 27 of FIG. 8 and FIG. 9*b* illustrates an enlarged version of a portion of the cross-sectional view showing two vanes 28. The principle of operation of the vanes shown in FIGS. 8, 9*a* and 9*b* remains the same as in the previously described embodiments.

Figure 10:
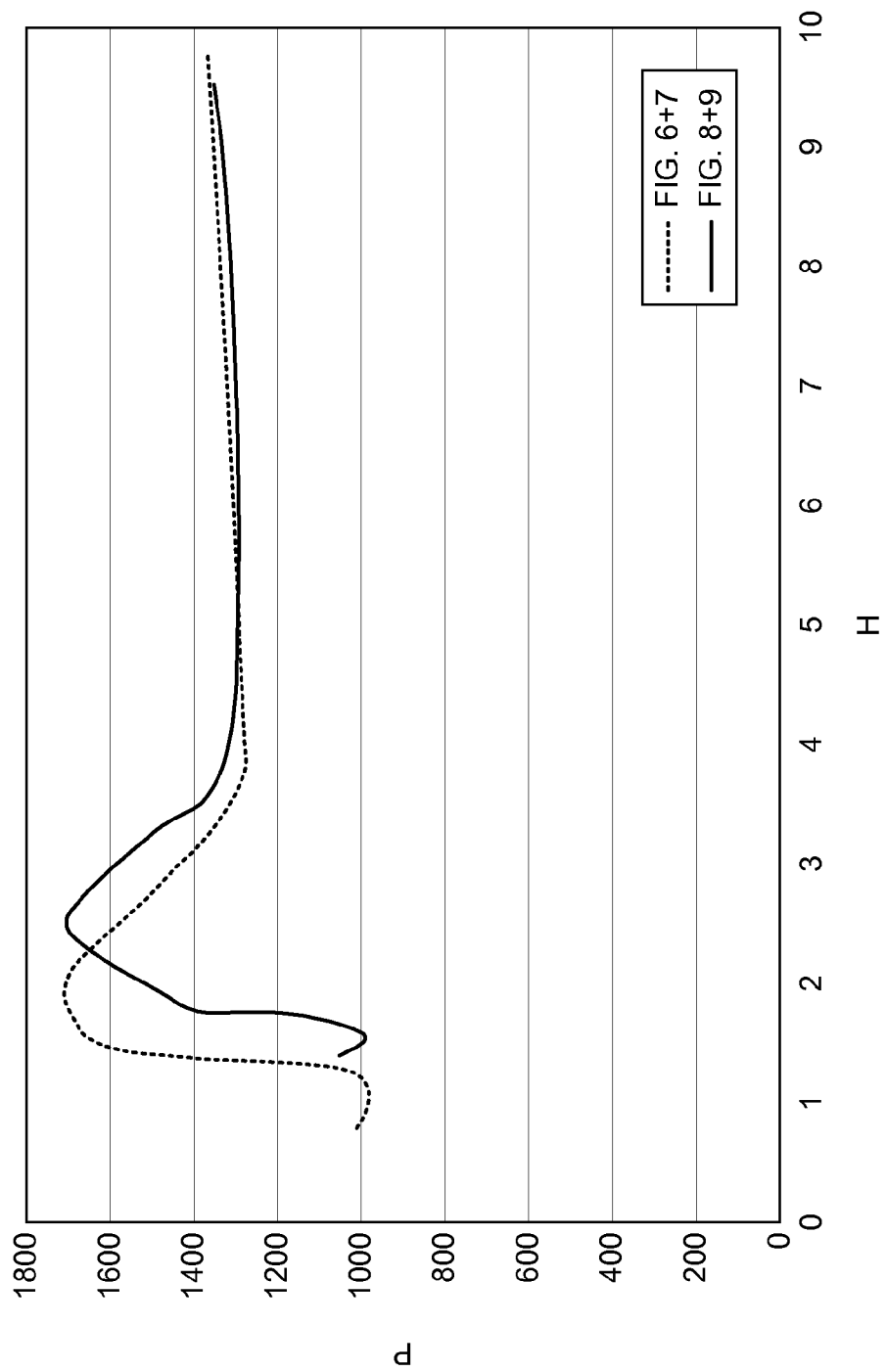
FIG. 10 is a graph to show the relationship between the static pressure drop (Pa) and distance H (mm) between vanes.

The graph of FIG. 10 shows the relationship between the static pressure drop P (Pa) and distance H (mm) between vanes for an air flow rate of 30 liters per second. It has been found that, with the blade geometry of FIGS. 6 and 7, the lowest pressure drop occurs when the distance H between vanes is between 1 to 1.5 mm. With the blade geometry of FIGS. 8 and 9, the distance H is slightly greater, at around 1.5 to 2 mm. Notably, the inventors have found that, with either vane geometry, the pressure drop increases markedly with only a small increase in vane spacing over the above quoted dimensions before dropping off again, but even with much larger spacing between vanes, the minimal pressure drop that is achieved with a spacing of between 1-2 mm is not achieved. The large increase in pressure drop occurs when the spacing between vanes slightly increases because the velocity of the air reduces as the width of the gap increases. Whilst a lower velocity would be expected to produce a lower pressure drop and a higher velocity a greater pressure drop, in the present case a greater pressure drop occurs when the velocity of the air is lower. This is because a lower velocity airflow generates a smaller area of overpressure 'P', thereby reducing the ability of the area of overpressure to reduce the degree of turbulence 'T' that occurs at the leading edge of the preceding vane and which serves to partially block or reduce the spacing between vanes, thereby generating a higher pressure drop.

Figure 11:
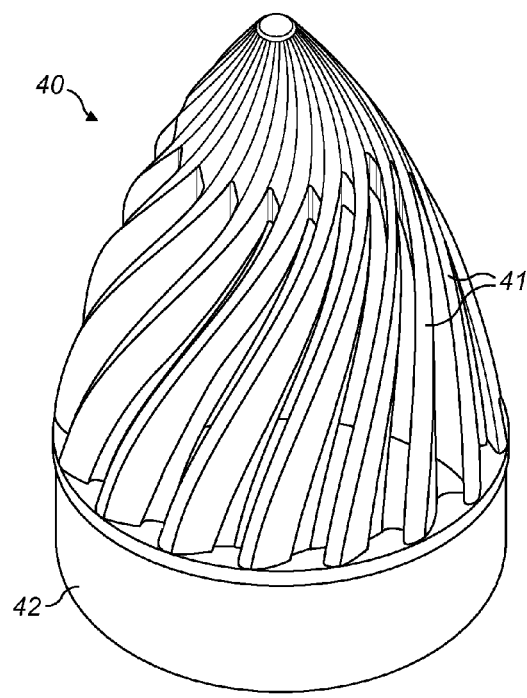
FIG. 11 is a perspective view of a vortex finder according to another embodiment.
Figure 12A:
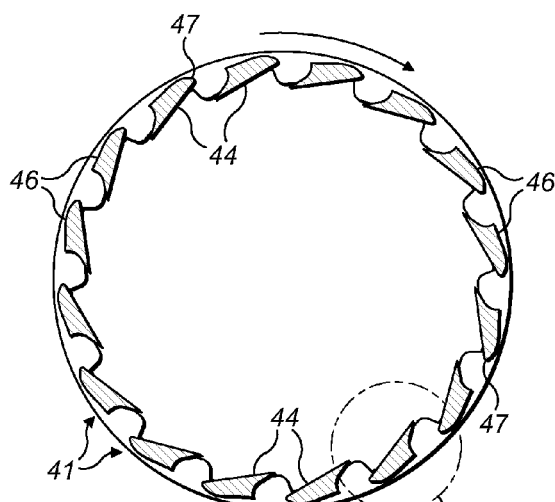
FIG. 12a shows a cross section through the vortex finder of FIG. 8.
Figure 12B:
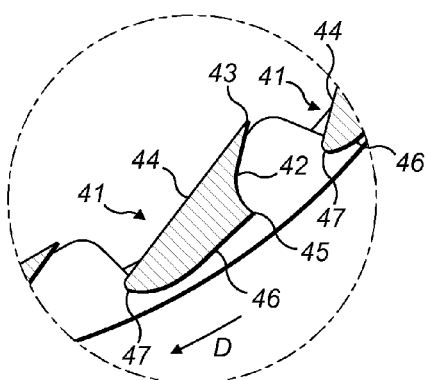
FIG. 12b illustrates and enlarged view of part of the cross-section shown in FIG. 11.

FIG. 11 shows a vortex finder 40 having a similar form to the vortex finder 18 of FIG. 6 and to the vortex finder 27 of FIG. 8, except that the vanes 41 extending from a collar 42 have a modified profile, as can be seen more clearly from the cross-section of FIG. 12*a* and the enlarged view of FIG. 12*b*. A trailing end face 42 is shaped so as to effectively contain the area of overpressure 'P' and/or direct it or make it more focused towards the area of turbulence. In one embodiment, the trailing end face 42 may effectively take the form of a trough or recess in the vane which is positioned so that the air directed against the vane 41 from the leading edge 47 of the preceding vane 41 enters the trough or recess to create the area of overpressure 'P' within the trough. More specifically, in one embodiment the trailing end face 42 of each vane 41 extends radially outward from an inner trailing end edge 43 where it meets an inner surface 44 of the vane 41 to an outer trailing end edge 45 where it meets the outer surface 46 of the vane 41 across which the air flows in direction 'D', as shown most clearly in FIG. 12*b*. The outer trailing end edge 45 is further forward in the direction of airflow 'D' than the lower trailing end edge 43 and the trailing end face 42 is curved between the inner and outer trailing end edges 43,45 to provide a concave surface that faces outwardly and towards the trailing edge 47 of the immediately preceding vane 41 and in which the area of overpressure 'P' is formed.

As described with reference to the previous embodiments, the vanes 41 are shaped and positioned to reduce the size of the turbulent region 'T' (see FIGS. 3 and 4) that tends to generate at the trailing edge 47 of each vane 41, and so that some of the air flowing across the outer surface 46 of each vane 41 is directed towards the outer surface 46 of the immediately adjacent vane 41 in the direction of air flow 'D' so that it collides or impacts upon the outer surface 46 of the adjacent vane 41 to form an area of increased pressure 'P' relative to surrounding areas. By shaping the leading edge of the vane 41 as described above and as illustrated in FIGS. 11 and 12, the area of overpressure 'P' is enhanced or is at least directed or more focused towards the area where turbulence 'T' occurs, thereby increasing the desired effect of minimizing the turbulence 'T'. The concave shaped trailing end face 42 acts as a trough which contains the area of overpressure P.

The vortex finder according to any embodiments of the invention may have an overall blade length extending from the collar to the apex of 60 mm. Preferred embodiments have 16 vanes and the diameter of the vortex finder at its largest point is in the order of 50 min so there can be 0.1 vane per mm of circumference. However, there may be 0.2 to 0.5 vanes per mm of circumference. The blade thickness may be around 2 mm, although could also be around 7 mm, such as in the embodiment of FIG. 9.

It will be appreciated that the term "comprising" does not exclude other elements or steps and that the indefinite article "a" or "an" does not exclude a plurality. The mere fact that certain measures are recited in mutually different dependent claims does not indicate that a combination of these measures cannot be used to an advantage. Any reference signs in the claims should not be construed as limiting the scope of the claims.

The invention claimed is:

1. A vortex finder for a cyclonic separator for allowing air flowing about an axis of a cyclone chamber to pass to an outlet, the vortex finder comprising:
   a plurality of stationary vanes, each stationary vane having a leading edge, a trailing edge and an outer surface extending between the leading edge and the trailing edge,
   wherein the plurality of stationary vanes are spaced radially around said axis when installed in a cyclone chamber, the vanes being positioned relative to each other for allowing a flow of air about the axis of the cyclone chamber to pass over an outer surface of the vanes with a portion of the air flow being redirected around the leading edge of each vane through a gap between the trailing edges of adjacent vanes to the outlet, and
   wherein, at any point along the axis, a portion of the outer surface of each vane lies on a circle having its center coaxial with said axis, the outer surface of each vane having a portion leading towards the leading edge that extends inwardly away from the circle so that the leading edge of each vane about which air is redirected through the gap between the training edges of adjacent vanes is located within a region bound by said circle.

2. A vortex finder according to claim 1, wherein the portion of said outer surface extending inwardly away from the circle is arcuate in shape.

3. A vortex finder according to claim 1, wherein the outer surface of each vane has a portion that extends outwardly from the trailing edge towards the circle and in a direction of airflow across the vanes.

4. A vortex finder according to claim 3, wherein said portion that extends outwardly from the trailing edge is arcuate in shape.

5. A vortex finder according to claim 1, wherein each vane has a face that defines a recessed region positioned to receive air directed against said vane from the leading edge of a preceding vane to create said region of overpressure in said recessed region.

6. A vortex finder according to claim 1, wherein an angle between a first plane ($T_1$) that extends at a tangent to the outer surface at the leading edge of a vane and a second plane ($T_2$) that extends at a tangent to the outer surface of an adjacent vane at a point where the first plane ($T_1$) intersects said adjacent vane is greater than 15 degrees.

7. A vortex finder according to claim 1, wherein said portion of the outer surface of each vane that lies on a circle at any point along the axis has an radius R, and said portion of the arcuately shaped outer surface of each vane that extends inwardly towards the axis has a radius r, wherein r<R.

8. A vortex finder according to claim 7, wherein the radius r of said portion of the arcuately shaped outer surface of each vane that extends inwardly towards the axis is greater than 0.2 mm.

9. A vortex finder according to claim 1, wherein for each vane, the outer surface of a vane narrows or tapers towards the leading edge of the vane.

10. A vortex finder according to claim 1, wherein for each vane, the outer surface of a vane tapers towards the trailing edge of the vane.

11. A vortex finder according to claim 1, wherein the vanes extend in a helical path about the axis.

12. A vortex finder according to claim 11, wherein the vanes taper inwardly towards the axis.

13. A cyclonic separator comprising a vortex finder according to claim 1.

14. A vacuum cleaner comprising the cyclonic separator according to claim 13.

15. A cyclonic separator according to claim 13, wherein the portion of said outer surface extending inwardly away from the from the circle is arcuate in shape.

16. A cyclonic separator according to claim 13, wherein the outer surface of each vane has a portion that extends outwardly from the trailing edge towards the circle and in a direction of airflow across the vanes.

17. A cyclonic separator according to claim 13, wherein each vane has a face that defines a recessed region positioned to receive air directed against said vane from the leading edge of a preceding vane to create said region of overpressure in said recessed region.

18. A vacuum cleaner according to claim 14, wherein at least said inwardly extending portion of said outer surface is arcuate in shape.

19. A vacuum cleaner according to claim 14, wherein the outer surface of each vane has a portion that extends outwardly from the trailing edge towards the circle and in a direction of airflow across the vanes.

20. A vacuum cleaner according to claim 14, wherein each vane has a face that defines a recessed region positioned to receive air directed against said vane from the leading edge of a preceding vane to create said region of overpressure in said recessed region.

* * * * *